Jan. 16, 1934.        W. W. VOSPER        1,943,644
TOOL CARRIER
Filed April 7, 1932
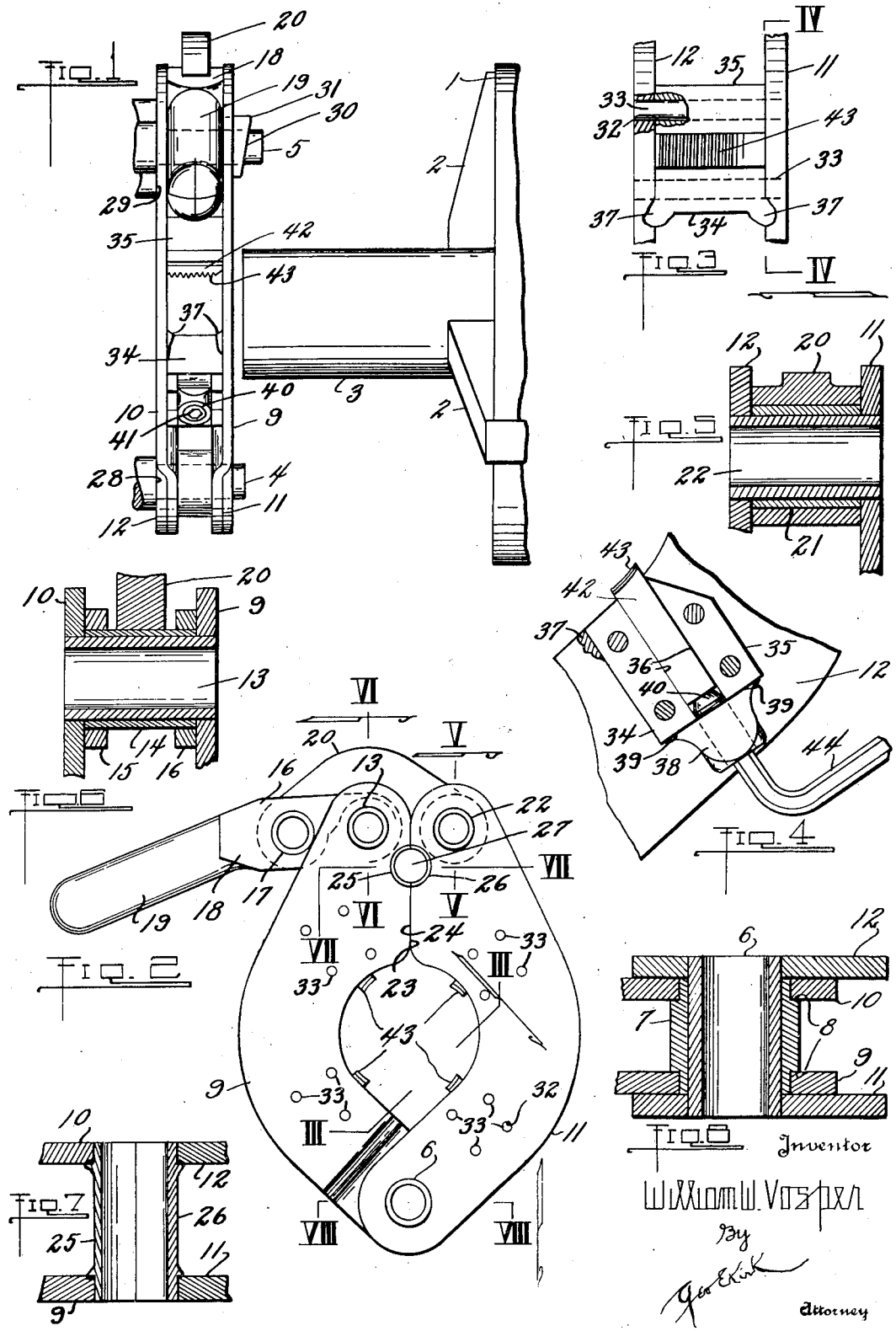
Inventor
William W. Vosper
By
Attorney Patented Jan. 16, 1934

1,943,644

UNITED STATES PATENT OFFICE 1,943,644

TOOL CARRIER

William W. Vosper, Toledo, Ohio, assignor to The Toledo Pipe Threading Machine Company, Toledo, Ohio, a corporation of Ohio Application April 7, 1932. Serial No. 603,855

7 Claims. (Cl. 10—100)

This invention relates to tool carrying heads.

This invention has utility when incorporated in demountable cutter heads, more especially for power apparatus such as pipe threading machines.

Referring to the drawings:

Fig. 1 is a fragmentary view of an embodiment of the invention in a readily demountable ring;

Fig. 2 is a side elevation of the openable tool carrying head or ring of Fig. 1;

Fig. 3 is a view on the line III—III, Fig. 2;

Fig. 4 is a view on the line IV—IV, Fig. 3;

Fig. 5 is a view on the line V—V, Fig. 2;

Fig. 6 is a view on the line VI—VI, Fig. 2;

Fig. 7 is a view on the line VII—VII, Fig. 2; and

Fig. 8 is a view on the line VIII—VIII, Fig. 2.

In the general type of machines shown in applicant's Patent 1,635,447, pair of rods 70, 71 is shown to mount a one-piece ring-carrying cutting tool. In the invention of this disclosure and in lieu of such ring, a split ring is provided. Rotary head 1 is provided with jaws 2 for clamping article to be acted upon or pipe 3. Pins 4, 5, are mounted to extend toward the head 1.

About the pin 4 there may be slipped tubular bearing 6. This tubular bearing, say of bronze, is shown nested in sleeve 7 having shoulders 8, upon which are press-fitted plates 9, 10. This sleeve 7 is short of the over-all length of the tubular bearing 6. However, this sleeve 7 is rotatable relatively to the tubular bearing or sleeve 6 while the plates 9, 10, are fast relatively to the sleeve 7.

Embracing or outer plates 11, 12, upon the tubular bearing 6 are fast with such sleeve 6. These parallel plates 9, 10, comprise one arc shaped element of the ring carrier complementary to opposing plates 11, 12, of companion complementary arc shaped section of the ring carrier. The plates 9, 10, remote from the tubular bearing 6 have steel sleeve 13 press-fit assembled therewith. Between these plates 9, 10, there is bronze bushing 14 providing a mounting for parallel plate members 15, 16, rigid with this bronze sleeve 14, thereby causing this sleeve 14 to rock on the sleeve 13 as a bearing. These plates 15, 16, extend past sleeve 17 to yoke portion 18 from which extends tubular arm or handle 19 as an operating lever. This may be a pipe section with closed terminus and brazed or sweat fitted into a unitary structure with the yoke 18.

Between the plates 15, 16, as a fork from the yoke 18, hump link 20 extends from the sleeve 17 as a bearing to be rocked on bronze sleeve 21 about tubular steel sleeve 22 between the plates 11, 12, remote from the tubular bearing 6, approximately similar distance therefrom as the tubular bearing 13. The side of the link 20 toward the sleeve 14 is a stop for the thrown-to-lock position for the handle 19. The hump in the link 20 provides clearance about the tubular bearing 13 in the rocking of the handle 19 to bring the bearing 17 into alignment with the plane of the axes of the tubular bearings 13, 18, or to bring this axis of the tubular bearing 17 slightly beyond or below such alignment plane. There is accordingly a past dead center locking in this pulled down position of the handle 19 to bring opposing faces 23, 24, of the complementary parallel plate sections 9, 10, and 11, 12, into snug abutting position.

These faces 23, 24, carry steel semi-cylindrical bearing sections 25, 26, in complementary relation so that these sections 25, 26, provide tubular way 27 as a second mounting seat for this expansible and collapsible ring or carrier to that at the sleeve or bearing 6. Accordingly, by thrusting the ring upon the pin 4 against shoulder 28, the tubular way 27 may be thrust on the companion pin 5 against shoulder 29. This pin 25 has beveled side cut-away portion 30 through which U-shaped wedge member 31 may be slipped for thus holding this ring carrier in assembled position with the mounting at pins 4, 5. This ring carrier or head is thus locked in fixed position concentric with the pipe 3.

Openings 32 are in register between the plates of the ring carrier and receive pins 33, which pins 33 also extend through blocks 34 and blocks 35. These blocks accordingly space the plates apart and provide therebetween a way having parallel sides 36. The pins 33 have drive fit assembly for snug holding of the plates together, and additionally, the pins are finished off flush to make such pins practically obscure in the completed tool. These pins 33 determine accurate location for the blocks in that the way sides 36 may be definitely located. Upon such definite location of the way, the block 34 is subjected to welds 37 supplementally holding these forged or wrought metal blocks as to the plates of forged or wrought metal complementary ring sections.

Independently of the complementary plate ring sections and bridging the way having the sides 36 is yoke 38 having weld termini 39 with the respective blocks 34, 35. This yoke is internally threaded and there receives headless screw 40 having outward wrench receiving seat 41.

The inner terminus of this threaded screw 40 may abut outer portion of cutting tool 42, say having thread cutting faces 43 as a chaser element. The respective tools 42 may thus be nicely adjusted by inserting wrench 44 in the respective seats 41 in locating the toothed thread sections 43 at the desired respective advance relation and in the concentric assembly as to the axis of this ring and the pipe.

Upon location of this ring in advance of the pipe or article to be cut or threaded, the rotary head 1 may be operated and the feeding occur between such head and the ring to the desired extend of operation therebetween. When said operation is completed, it is only necessary for the operator to swing the handle 19 away from the toggle locked position, thereby opening the ring section so that the pipe or work may be readily removed. The split ring head may then be reclamped for a repetition of the same operation upon other work or the head may be readily substituted. The dies or tools proper may be readily replaced.

There is accordingly provided herein a light weight, substantial, wrought iron or steel type of working unit head, which may be economically manufactured in quantities with a minimum of machine operations and a maximum of accuracy for cutting tool operations.

What is claimed and it is desired to secure by United States Letters Patent is:

1. A tool carrier comprising a pair of opposing sections, a direct hinge connection therebetween upon which the sections may swing in opening and closing, and a toggle connection therebetween remote from the hinge connection including a pair of links directly connected to each other and directly connected one to each of said sections for actuating the sections in said opening and closing, and one of said links having a bearing at one of said sections effective in closing position as a lock.

2. A tool carrier comprising a pair of opposing complementary ring sections, a direct hinge connection therebetween comprising a tubular pivot bearing adapted to receive a first stub shaft to position a carrier, said sections having remote from said bearing a pair of tubular bearings, and a toggle connection between said latter tubular bearings, said sections providing complementary semi-cylindrical seat portions adjacent the toggle as a companion toggle locating mounting bearing or seat adapted to receive a second stub shaft to further position the carrier in addition to said tubular bearing seat at said first stub shaft.

3. A cutting tool carrier comprising a pair of complemental sections, each section including a pair of parallel sheet metal plates, block spacing means in annular series between the plates having locating means for the spacing means as to the plates, said spacing means being weld anchored to the plates within the region directly between the plates against relative shifting.

4. A cutting tool carrier comprising a pair of complemental sections, each section including a pair of parallel sheet metal plates, block spacing means in annular series between the plates, there being openings in the plates and means, and pins, each in a pair of plate openings and through a block spacing means determining assembly relation therebetween, and weld anchoring means between the block and plates in the region directly between the plates and fixing said assembly relation.

5. A cutting tool carrier comprising a pair of complemental sections, each section including a pair of parallel sheet metal plates, and pairs of blocks in annular series between the plates and within the radial extent of said plates, said blocks having locating means as to the plates, each pair of the blocks providing therebetween a parallel walled way adapted to receive a cutter, there being anchoring means between the plates and blocks establishing symmetry for the grouping of said ways.

6. A cutting tool carrier comprising a pair of complemental sections, each section including a pair of parallel sheet metal plates, pairs of blocks in annular series between the plates, there being openings in the plates and blocks, pins through the plate and block openings, and additional weld means within the region directly between the plates anchoring the plates with the blocks, each pair of blocks providing therebetween an outwardly extending parallel walled way adapted to receive a cutting tool, and means for adjusting said tool relatively to the way.

7. A cutting tool carrier comprising a pair of complemental sections, each section including a pair of parallel sheet metal plates, pairs of blocks in annular series between the plates and within the radial extent of said plates, each pair of the blocks providing therebetween a parallel walled way adapted to receive a cutter, there being anchoring means between the plates and blocks establishing symmetry for the grouping of said ways, a bracket across each of said ways independently of the plates connecting the blocks of the pair, said bracket forming a yoke providing a seat, and cutter adjusting means operable in said seat.

WILLIAM W. VOSPER.